US010728312B2

(12) United States Patent
Blumenau

(10) Patent No.: US 10,728,312 B2
(45) Date of Patent: Jul. 28, 2020

(54) DATA CENTER NETWORK CONTAINERS

(71) Applicant: Actifio, Inc., Waltham, MA (US)

(72) Inventor: Steven M. Blumenau, Holliston, MA (US)

(73) Assignee: Actifio, Inc., Waltham, MA (US)

( * ) Notice: Subject to any disclaimer, the term of this patent is extended or adjusted under 35 U.S.C. 154(b) by 189 days.

(21) Appl. No.: 15/449,562

(22) Filed: Mar. 3, 2017

(65) Prior Publication Data
US 2018/0255124 A1 Sep. 6, 2018

(51) Int. Cl.
*H04L 29/08* (2006.01)
*H04L 29/12* (2006.01)

(52) U.S. Cl.
CPC .......... *H04L 67/10* (2013.01); *H04L 61/1511* (2013.01); *H04L 61/2015* (2013.01); *H04L 61/2514* (2013.01); *H04L 61/2535* (2013.01)

(58) Field of Classification Search
CPC . H04L 12/40013; H04L 12/413; H04L 12/66; H04L 65/1013; H04L 12/2803; G06F 15/16
USPC .......................................... 709/217; 370/401
See application file for complete search history.

(56) References Cited

U.S. PATENT DOCUMENTS

| 7,366,188 | B2* | 4/2008 | Kim ..................... H04L 12/4633 370/401 |
| 7,424,115 | B2* | 9/2008 | Hyyppa ............. H04W 12/0609 380/44 |
| 8,180,891 | B1* | 5/2012 | Harrison ................. H04L 63/10 709/224 |
| 8,416,787 | B2* | 4/2013 | Lv ....................... H04L 12/4641 370/352 |
| 8,509,391 | B2* | 8/2013 | Elliot ............... H04L 12/40013 379/37 |
| 8,707,254 | B2* | 4/2014 | Oslake ..................... G06F 8/30 717/106 |
| 9,716,902 | B2* | 7/2017 | Ogle .................. H04N 21/2143 |
| 9,813,233 | B2* | 11/2017 | Wicker .................. H04W 8/16 |

(Continued)

OTHER PUBLICATIONS

Wikipedia, "Broadcasting (networking)," <https://en.wikipedia.org/wiki/Broadcasting_(networking)> page last modified on Dec. 24, 2016 (2 pages).

(Continued)

*Primary Examiner* — Tesfay Yohannes
(74) *Attorney, Agent, or Firm* — Wilmer Cutler Pickering Hale and Dorr LLP

(57) ABSTRACT

Techniques include systems, computerized methods and computer readable media for creating a private network for one or more execution environments inside of an existing network using a data center container, such that the private network can provide one or more services that are independent of identical services of the existing network. A private network is created in an existing network. A data center container provides a service in the private network that is identical to an existing service provided by the existing network. A data center container manager manages execution of one or more execution environments in the data center container using the service in the private network, such that the one or more execution environments can execute in the private network using the service without interfering with the operation of the existing service in the existing network.

17 Claims, 14 Drawing Sheets

(56) References Cited

U.S. PATENT DOCUMENTS

| | | | | |
|---|---|---|---|---|
| 9,986,279 B2 * | 5/2018 | Harrison | .......... | H04N 21/64322 |
| 9,998,434 B2 * | 6/2018 | Verzun | .................. | H04L 9/34 |
| 10,333,731 B2 * | 6/2019 | Ebrom | ................ | G06F 9/44505 |
| 2011/0276951 A1 * | 11/2011 | Jain | .................... | G06F 11/3006 |
| | | | | 717/140 |

OTHER PUBLICATIONS

Wikipedia, "Docker (software)," <https://en.wikipedia.org/wiki/Docker_(software)> page last modified on Feb. 13, 2017 (6 pages).

Wikipedia, "Domain Name System," <https://en.wikipedia.org/wiki/Domain_Name_System> page last modified on Feb. 27, 2017 (15 pages).

Wikipedia, "Dynamic Host Configuration Protocol," <https://en.wikipedia.org/wiki/Dynamic_Host_Configuration_Protocol> page last modified on Feb. 28, 2017 (18 pages).

Wikipedia, "Gateway (telecommunications)," <https://en.wikipedia.org/wiki/Gateway_(telecommunications)> page last modified on Feb. 27, 2017 (4 pages).

Wikipedia, "Hypervisor," <https://en.wikipedia.org/wiki/Hypervisor> page last modified on Feb. 8, 2017 (6 pages).

Wikipedia, "Internet protocol suite," <https://en.wikipedia.org/wiki/Internet_protocol_suite> page last modified on Feb. 6, 2017 (12 pages).

Wikipedia, "IP address," <https://en.wikipedia.org/wiki/IP_address#Static_IP> page last modified on Mar. 2, 2017 (9 pages).

Wikipedia, "IP address," <https://en.wikipedia.org/wiki/IP_address> page last modified on Mar. 2, 2017 (9 pages).

Wikipedia, "IP aliasing," <https://en.wikipedia.org/wiki/IP_aliasing> page last modified on Dec. 2, 2016 (1 page).

Wikipedia, "iptables," <https://en.wikipedia.org/wiki/Iptables> page last modified on Feb. 16, 2017 (4 pages).

Wikipedia, "Jump server," <https://en.wikipedia.org/wiki/Jump_server> page last modified on Feb. 17, 2017 (3 pages).

Wikipedia, "List of TCP and UDP port numbers," <https://en.wikipedia.org/wiki/List_of_TCP_and_UDP_port_numbers> page last modified on Mar. 3, 2017 (58 pages).

Wikipedia, "Loopback," <https://en.wikipedia.org/wiki/Loopback> page last modified on Feb. 6, 2017 (3 pages).

Wikipedia, "Network address translation," <https://en.wikipedia.org/wiki/Network_address_translation> page last modified on Feb. 28, 2017 (12 pages).

Wikipedia, "Network interface controller," <https://en.wikipedia.org/wiki/Network_interface_controller> page last modified on Feb. 23, 2017 (5 pages).

Wikipedia, "Network Time Protocol," <https://en.wikipedia.org/wiki/Network_Time_Protocol> page last modified on Feb. 28, 2017 (8 pages).

Wikipedia, "Ping (networking utility)," <https://en.wikipedia.org/wiki/Ping_(networking_utility)> page last modified on Jan. 7, 2017 (5 pages).

Wikipedia, "Router (computing)," <https://en.wikipedia.org/wiki/Router_(computing)> page last modified on Mar. 2, 2017 (7 pages).

Wikipedia, "Routing table," <https://en.wikipedia.org/wiki/Routing_table> page last modified on Oct. 27, 2016 (4 pages).

Wikipedia, "Transmission Control Protocol," <https://en.wikipedia.org/wiki/Transmission_Control_Protocol> page last modified on Feb. 28, 2017 (19 pages).

Wikipedia, "Virtual machine" <https://en.wikipedia.org/wiki/Virtual_machine> page last modified on Feb. 28, 2017 (5 pages).

* cited by examiner

DATA CENTER NETWORK CONTAINERS

FIELD

The subject matter disclosed in this application generally relates to networking, and in particular to using a data center container to create a network.

BACKGROUND

In this discussion, an executable can refer to a single instance of a set of execution code that performs one or more operations or services. An example of an executable is a web server, which is well known in the industry. For this example, it will be assumed there is a single executable representing the services provided by a web server. A web server processes requests that are received using the HTTP protocol and performs local operations and sends back information such as a web page. The web server could handle the user authenticating themselves plus looking up information in databases along with responding to requests for information. Another example of an executable is a relational database server implemented as a single executable. In this case, it will receive SQL requests and perform operations on the database and data and return the results of the request. An execution environment can be a computer, virtual machine, software container, and/or the like that an executable can execute in. An application or solution can be a set of executables running in the same or different execution environments. An example of such a hierarchy is shown in FIG. 13, which is described further below.

Computer applications have become larger and more complex over time. Along with this, advances with computer hardware has enabled multiple executables to run together in a single computer or across multiple computer environments. A typical solution or application is made up or a number of separate executables. With the new use of software containers, applications are being further broken up into smaller pieces called micro-services. All of these independent executables communicate to create the single solution offered to the end user. The use of software containers and virtual machines in many configurations, has created an environment where each software container or virtual machine is running a single executable.

Many of these solutions often have configurations that require the executables, running in their own execution environments, to have static IP addresses or to be able to lookup services by name. A static IP address is when an execution environment has pre-defined the network IP address that it will use. Every time it starts, the execution environment typically uses the exact same address. This is in comparison to DHCP (Dynamic Host Configuration Protocol), which automatically assigns IP addresses when the execution environment starts. Regardless if the execution environment is using a static IP address or DHCP IP address, the executables running in the execution environment may need to request the IP address of another executable. This is done by making a special network call to a DNS (Domain Name Server) service on the network. The DNS service will convert a known name into an IP address.

Problems can arise if one needs to have multiple copies of the complete solution and the solution was not designed to have its static IP addresses or DNS names be different for each installation. For example, if the database server is sent network messages using an IP address of 172.16.166.20 or by using a name like centraldbsvr (e.g., which is converted to an IP address using DNS), then it can be difficult to run multiple copies of the solution (e.g., in the same network) because the address or name is pre-configured in the solution.

Another problem can occur if one would like to move part of the solution, for example an executable, to another compute environment. Since the executables often communicate over the network, if the executables are on the same computer, or in same computer room, building, or wider disbursement, then moving a part of the solution should not matter as long as the network can determine how to deliver the network message using the provided IP address. However, problems can arise if the required IP address or DNS name already exists in the network that you want to move an executable to or run the $2^{nd}$ or more copies in. In this case, there is a network address conflict and message delivery cannot occur, which means the solution will not work.

SUMMARY

Data center containers can allow duplicate IP addresses and DNS names to exist in the same network, without creating network addressing conflicts, and still allowing proper network deliver of messages. Data center containers can therefore allow complex application solutions, made up of multiple executables to be easily duplicated or spread across multiple environments without having duplicate IP address or DNS naming conflicts in the environment.

Some embodiments include a computerized method of creating a private network for one or more execution environments inside of an existing network using a data center container, such that the private network can provide one or more services that are independent of identical services of the existing network. The method includes creating, in an existing network, a private network comprising providing, by a data center container, a service in the private network that is identical to an existing service provided by the existing network, and managing, by a data center container manager, execution of one or more execution environments in the data center container using the service in the private network, such that the one or more execution environments can execute in the private network using the service without interfering with the operation of the existing service in the existing network.

Some embodiments include a system for creating a private network for one or more execution environments inside of an existing network using a data center container, such that the private network can provide one or more services that are independent of identical services of the existing network. The system includes a processor in communication with a memory, wherein the processor is configured to run a computer program stored in the memory that is configured to create, in an existing network, a private network including providing, by a data center container, a service in the private network that is identical to an existing service provided by the existing network, and managing, by a data center container manager, execution of one or more execution environments in the data center container using the service in the private network, such that the one or more execution environments can execute in the private network using the service without interfering with the operation of the existing service in the existing network.

Some embodiments include a non-transitory computer readable medium having executable instructions associated with a system for creating a private network for one or more execution environments inside of an existing network using a data center container, such that the private network can provide one or more services that are independent of identical services of the existing network. The executable instructions are operable to cause the system to create, in an existing network, a private network including providing, by a data center container, a service in the private network that is identical to an existing service provided by the existing network, and managing, by a data center container manager, execution of one or more execution environments in the data center container using the service in the private network, such that the one or more execution environments can execute in the private network using the service without interfering with the operation of the existing service in the existing network.

In some embodiments, the service provides a network environment that is separate from the existing network, which allows a same IP address being used in the existing network to also be used for an execution environment of the one or more execution environments in the data center container.

In some embodiments, the network environment includes a routing protocol configured to route communications among internal devices operating in the private network, and communications between the internal devices in the private network and external devices in the existing network. Each of the internal devices can include a router table configured to route all communications to a router in the data center container manager In some embodiments, routing communications among internal devices includes receiving a communication from a first internal device in the private network destined for a second internal device in the private network, and transmitting the communication to the second internal device in the private network such that the first internal device and second internal device do not communicate directly with each other.

In some embodiments, routing communications between the internal devices in the private network and external devices in the existing network includes receiving a communication from a first internal device destined for a second external device, converting an internal IP address associated with the communication to an external IP address for the existing network, and transmitting the communication to the external network.

Before explaining example embodiments consistent with the present disclosure in detail, it is to be understood that the disclosure is not limited in its application to the details of constructions and to the arrangements set forth in the following description or illustrated in the drawings. The disclosure is capable of embodiments in addition to those described and is capable of being practiced and carried out in various ways. Also, it is to be understood that the phraseology and terminology employed herein, as well as in the abstract, are for the purpose of description and should not be regarded as limiting.

These and other capabilities of embodiments of the disclosed subject matter will be more fully understood after a review of the following figures, detailed description, and claims. It is to be understood that both the foregoing general description and the following detailed description are explanatory only and are not restrictive of the claimed subject matter.

BRIEF DESCRIPTION OF THE DRAWINGS

Various objects, features, and advantages of the disclosed subject matter can be more fully appreciated with reference to the following detailed description of the disclosed subject matter when considered in connection with the following drawings.

DESCRIPTION

In the following description, numerous specific details are set forth regarding the systems and methods of the disclosed subject matter and the environment in which such systems and methods may operate, in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the embodiments described below are only examples, and that it is contemplated that there are other systems and methods that are within the scope of the disclosed subject matter.

The following description includes exemplary descriptions of networking terminology and descriptions on how IP networks work. Anyone skilled in the art of networking will understand these features and principles, and will understand that various alternatives and configurations can be substituted (e.g., according to the particular network deployment, underlying hardware, architecture, and/or the like). Therefore, references to such descriptions is used for exemplary purposes only and are not intended to be limiting.

Figure 13:
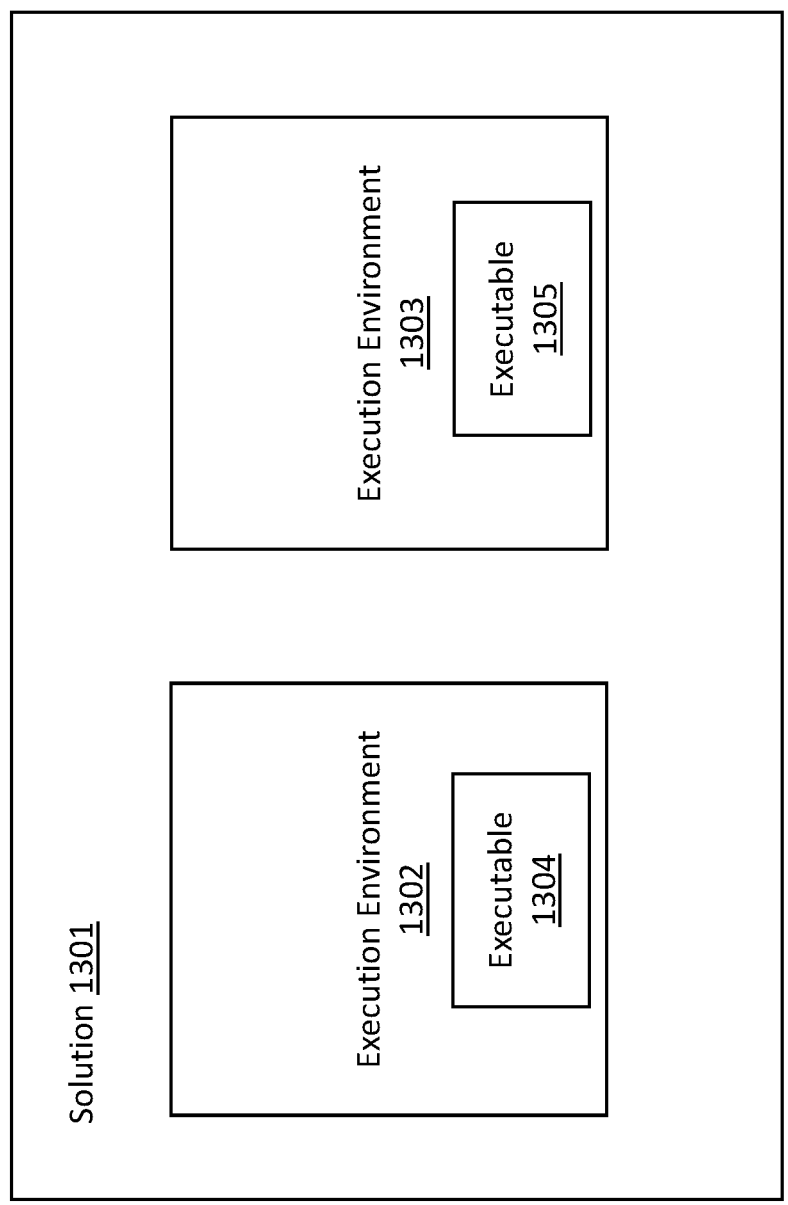
FIG. 13 illustrates an exemplary solution of a typical deployment of executables in execution environments combined to create a solution, according to some embodiments.

FIG. 13 illustrates an exemplary solution of a typical deployment of executables in execution environments combined to create a solution, according to some embodiments. This contains a Solution 1301 which is created from multiple execution environments 1302, 1303, and each execution environment has an executable 1304 and 1305.

A modern solution 1301, provides an operation or service for the user. With modern technology, complex solutions 1301 are typically implemented with multiple executables 1304, 1305. Each executable 1304, 1305 would provide a specific set of operations or services required for the complete solution. In modern implementations, the use of virtual machines (e.g., which can be seen at https://en.wikipedia.org/wiki/Virtual_machine) and software containers (e.g., which can be seen at https://en.wikipedia.org/wiki/Docker_(software)) can enable each executable 1304, 1305 to run in their own isolated environment.

Each of the isolated environments of a solution must run in a network to enable communication between the executables 1304, 1305. The communication allows the set of executables 1304, 1305 to act like a single solution 1301 providing the operation or service for the user.

Figure 1:
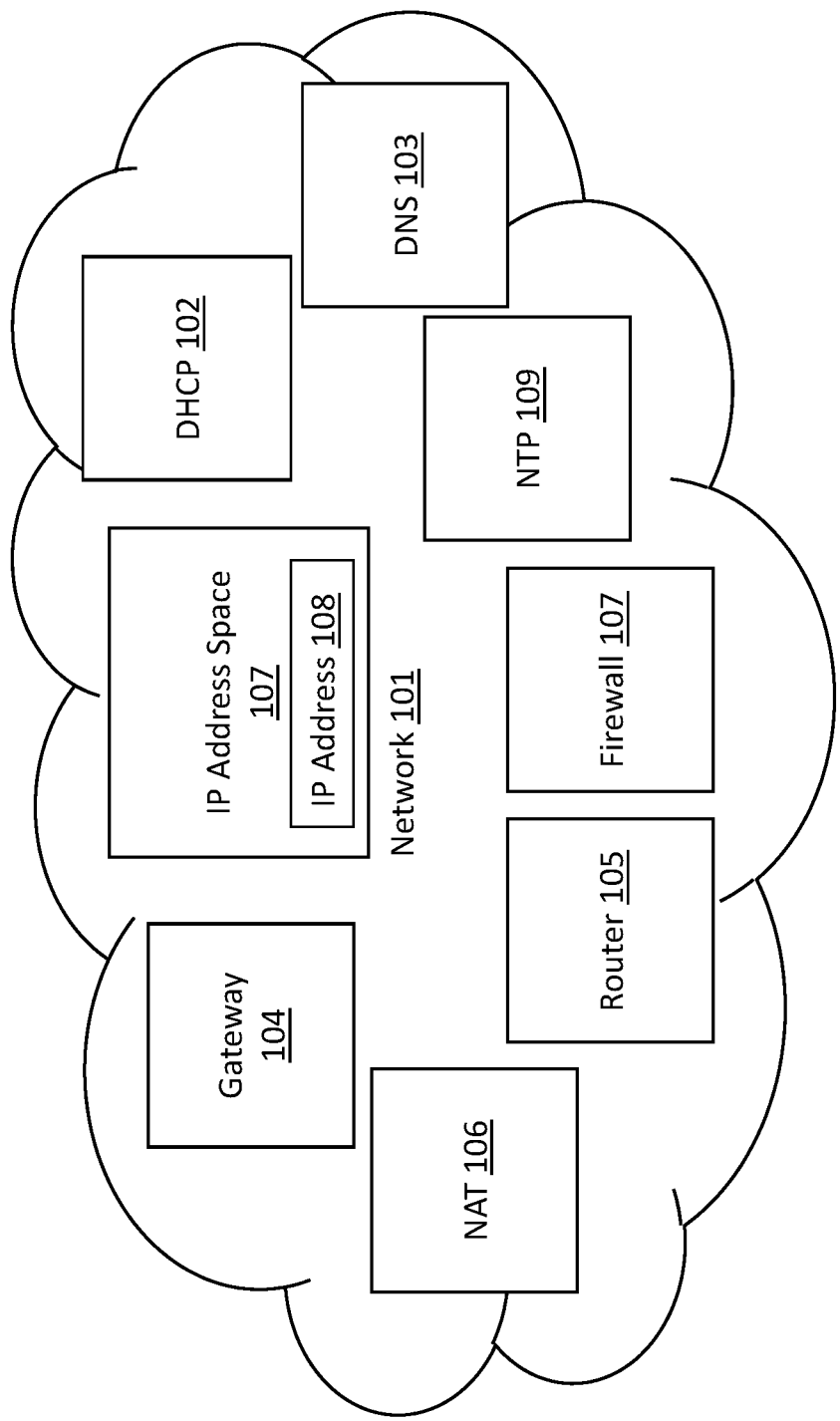
FIG. 1 illustrates an exemplary network with an IP address space and network services of Gateway, DHCP, NAT, Router and DNS, according to some embodiments.

FIG. 1 illustrates an exemplary network 101 with an IP address space 107, IP address 108 and network services of Gateway 104, DHCP 102, NAT 106, Router 105, Firewall 107, DNS 103 and NTP 109, according to some embodiments. FIG. 1 shows a typical network 101 with the more popular network services. A network 104 provides a mechanism which allows communication between executables, such as the executables 1304, 1305, shown in FIG. 13.

A popular networking protocol often used is called TCP/IP (e.g., which can be read about at https://en.wikipedia.org/wiki/Internet_protocol_suite), in which the address used for each execution environment is typically called an IP address 108, which exists in an IP address space 107 which represents the set of legal IP addresses that can exist in the network. The IP address 108 is the address used to identify the delivery location for communication over the network. An example of the version 4 of the IP address would be 172.16.166.20. IP addresses 108 are well understood in the industry (which can be read about at https://en.wikipedia.org/wiki/IP_address).

Figure 2:
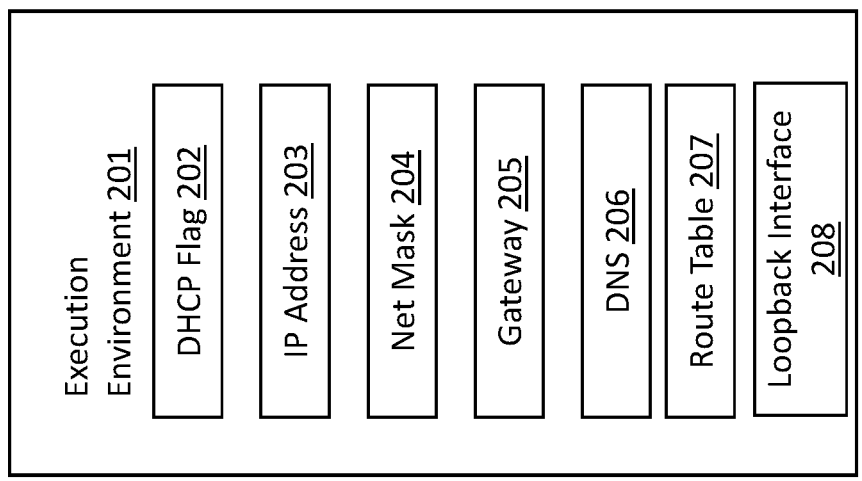
FIG. 2 illustrates an exemplary execution environment and the basic attributes that describe how it will interact with the network, according to some embodiments.

The network provides Gateway 104 services, DHCP 102 services, DNS 103 services, Router 105 services, and NAT 106 services. DHCP 102, also called Dynamic host Configuration Protocol (e.g., which can be read about at https://en.wikipedia.org/wiki/Dynamic_Host_Configuration_Protocol), is a network service that automatically provides an IP address to an execution environment (E.G., the execution environments 1302, 1303 shown in FIG. 13). For example, when the execution environment is starting, if it is configured to use DHCP, it sends out a special broadcast message requesting an IP address. The IP address 108, along with other relevant information is returned and the execution environment then configures itself to work on the network. The relevant information returns, for example, the network settings so an execution environment 1302, FIG. 13, can successfully communicate on a network. This can include information as shown in FIG. 2, and specifically can include IP address 203, net mask 204, gateway 205, and DNS 206. Along with these fields, other optional information and housekeeping information could be return in different implementations.

DNS 103, also called Domain Name System (e.g., which can be read about at https://en.wikipedia.org/wiki/Domain_Name_System) is a network service that allows an executable (e.g., shown in FIG. 13 as 1304, 1305) or execution environment (e.g., shown in FIG. 13 as 1302, 1303) to convert a text name to a numeric IP address 107.

The router 105 (e.g., which can be read about at https://en.wikipedia.org/wiki/Router_(computing)), is a mechanism that can move network messages from one network IP address space 107 to a different IP address space in another network. A router 105 can also be used to move network messages within the same network. This is typically done if one would like rules to be applied on how and if the network message should be sent. The firewall 107 has a rule table inside used to decide if network messages should be allowed to continue to their destination or dropped from the network 101.

NAT 106, also called Network Address Translation (e.g., which can be read about at https://en.wikipedia.org/wiki/Network_address_translation) is a network service than allows one to modify network addresses in messages as they move through the network 101. A typical use of NAT 106 is in conjunction with a Gateway 104 when messages are moving from the network 101 to the public internet. In this case, the IP address 108 would not be recognized on the internet (a different network) and a special change is made for this to work.

A Gateway 104 (e.g., which can be read about at https://en.wikipedia.org/wiki/Gateway_(telecommunications)), is a network service similar to the router 105 except that a router is typically used to move messages between networks of similar protocols, while a gateway is typically used to move messages between networks that are not similar. Over time, the protocol in the internet and the internal network have become the same but the term gateway 104 is still used for the special router that moves messages from the internal network 101 to the internet.

NTP 109, also called Network Time Protocol (e.g., which can be read about at http://en.wikipedia.org/wiki/Network_Time_Protocol) is special protocol used to synchronize clocks between computers. In a network 101, one could find a NTP 109 service. They are called by many names such as NTP server, Network Time Service, Time Server or Time Service. A public example of this can be found at http://www.time.gov which is run by the United States Department of Commerce, National Institute of Standards and Technology (NIST) and the U.S. Naval Observatory (UNSO).

Figure 14:
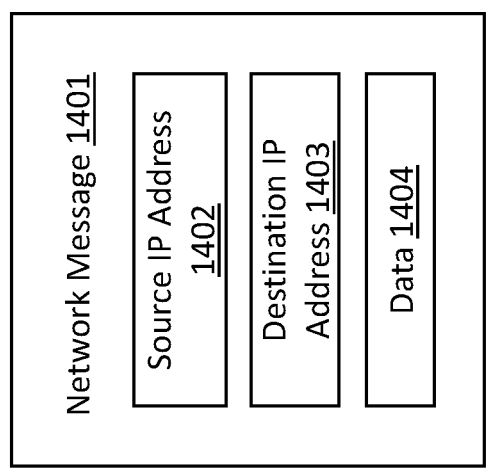
FIG. 14 illustrates an exemplary simplified example of an IP network message, according to some embodiments.

FIG. 14 illustrates an exemplary simplified example of an IP network message, according to some embodiments. There is a network message 1401 which includes a source IP address 1402, destination IP address 203 and data 204.

FIG. 14 is a simplified description of a network message 1401 which could also be called a network packet. The details included in this figure represent the information required to understand data center containers and how they work. More information about the details inside a TCP/IP network message can be found at, e.g., https://en.wikipedia.org/wiki/Transmission_Control_Protocol. The source IP address 1402 can be, for example, the IP address (e.g., IP address 108 in FIG. 1) of the sender of the network message 1401. The destination IP address 1403 is the IP address (e.g., IP address 108 in FIG. 1) of the receiver of the network message 1401. Data 1404 is also called the network message payload and represents that data being sent from source IP address 1402 to destination IP address 1403.

FIG. 2 illustrates an exemplary execution environment and the basic attributes that describe how it will interact with the network, according to some embodiments. The execution environment 201 represents a computer, virtual machine or software container, and/or the like, as described previously. The typical attributes required to describe the network connection are DHCP flag 202, IP address 203, net mask 204, gateway 205, DNS 206, route table 207 and loopback interface 208.

The DHCP Flag 202 is used to indicate to the execution environment 201 during initialization it should either use DHCP network service (e.g., shown in FIG. 1 as 102) to obtain an IP address or use a static IP address for the IP address 203. If the execution environment is set up to use a DHCP network service, then the IP address 203, net mask 204, gateway 205 and DNS 206 will be set up automatically through DHCP. If the DHCP flag 202 is set to use a static configuration, then IP address 203, net mask 204, gateway 205 and DNS 206 will be specified by the user. IP address 203 is a legal IP address (e.g., as shown in FIG. 1 at 108 in the IP address space 107). Net mask 204 is a bit mask that is used along with the IP address 203 that tells the system what portion of the IP address 203 is used to define the IP address space (e.g., shown in FIG. 1 at 107) and what part can be used to create unique addresses (e.g., see https://en.wikipedia.org/wiki/IP_address for more information). Gateway 205 is the address of the gateway network service (e.g., shown in FIG. 1 at 104). DNS 206 is the IP address to the DNS network service (e.g., shown in FIG. 1 at 103). Sometimes there are two DNS 206 IP addresses. The route table 207 (e.g., which can be read about at https://en.wikipedia.org/wiki/Routing_table) is table of rules that help the networking software in the execution environment 201 to decide where in the network it should send messages. For example, there is typically a default rule that says if no other rules are used, send the message to the gateway (e.g., FIG. 1 at 104). Many operating systems provide a loopback interface 208 (e.g., which can be read about at http://en.wikipedia.org/wiki/LoopBack, Virtual loopback interface). No network messages are passed outside of the execution environment 201. Although one typically finds 127.0.0.1 as the IP address 203 for the loopback interface 208, one can assign multiple IP addresses to the loopback interface.

Figure 3:
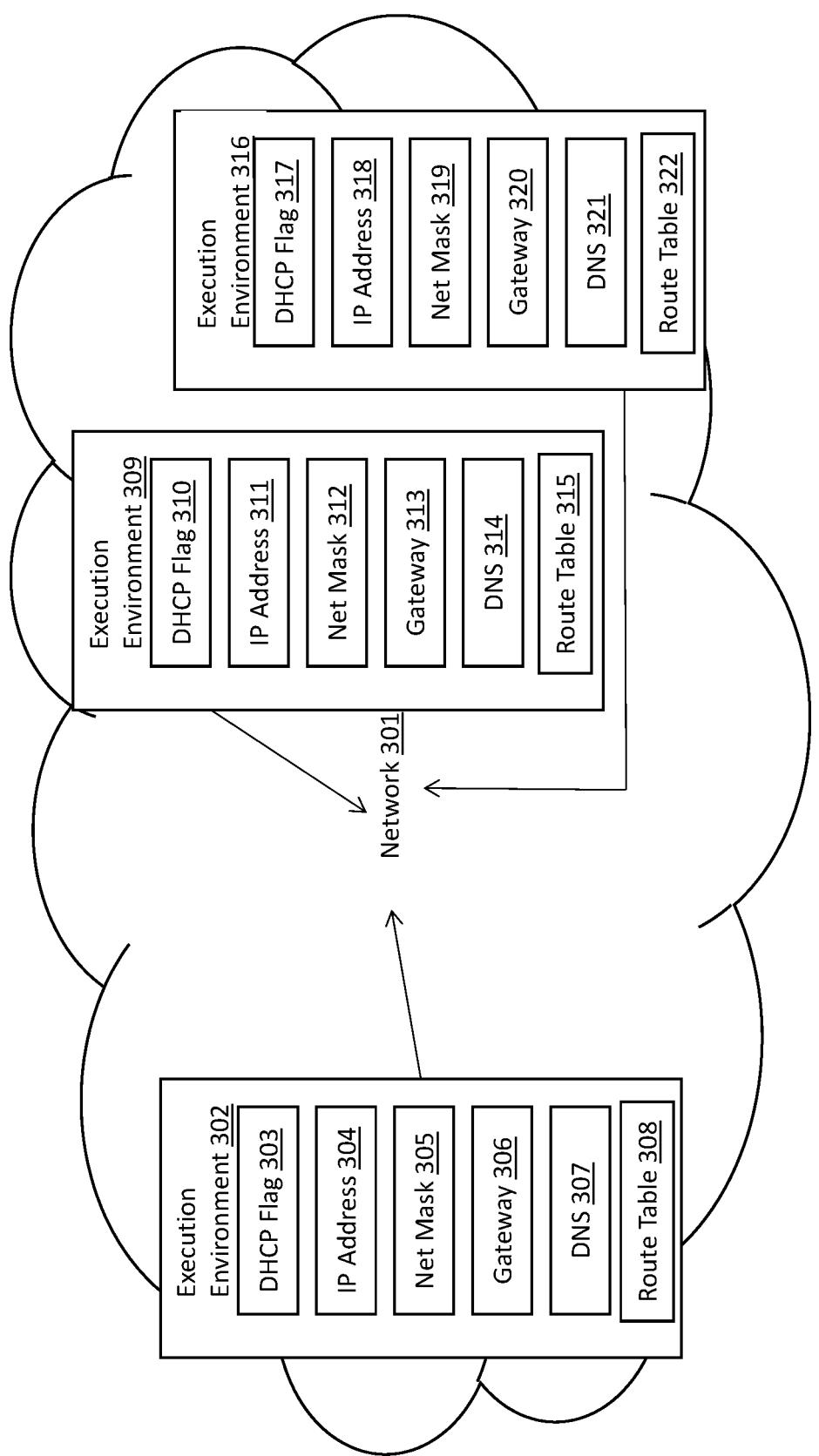
FIG. 3 illustrates an exemplary solution that is made up from multiple execution environments in a network, according to some embodiments.

FIG. 3 illustrates an exemplary solution that is made up from multiple execution environments in a network, according to some embodiments. FIG. 3 has a network 301 that provides an infrastructure for execution environments 302, 309 and 316 to communicate. Execution environment 302 has DHCP flag 303, IP address 304, net mask 305, gateway 306, DNS 307 and route table 308. Execution environment 309 has DHCP flag 310, IP address 311, net mask 312, gateway 313, DNS 314 and route table 315. Execution environment 316 has DHCP flag 317, IP address 318, net mask 319, gateway 320, DNS 321 and route table 322.

FIG. 3 shows three execution environments 302, 309, 316 that are communicating by sending and receiving network messages (e.g., shown in FIG. 14 as 1401) through the network 301. In this configuration, a network message that is placed on the network 301 will be presented to all the other execution environments, which will look at the destination IP address (e.g., shown in FIG. 14 as 1403) to decide if the message was being sent to that particular execution environment. All other execution environments 302, 309, 316 will ignore the message if the destination IP address (e.g., shown in FIG. 14 as 1403) does not match their IP address 304, 311, and 318, respectively. One can see that if IP address 304 and IP address 311 were set to the exact same value, then there would be a network conflict if execution environment 316 tried to send a network message to that specific IP address.

Figure 4:
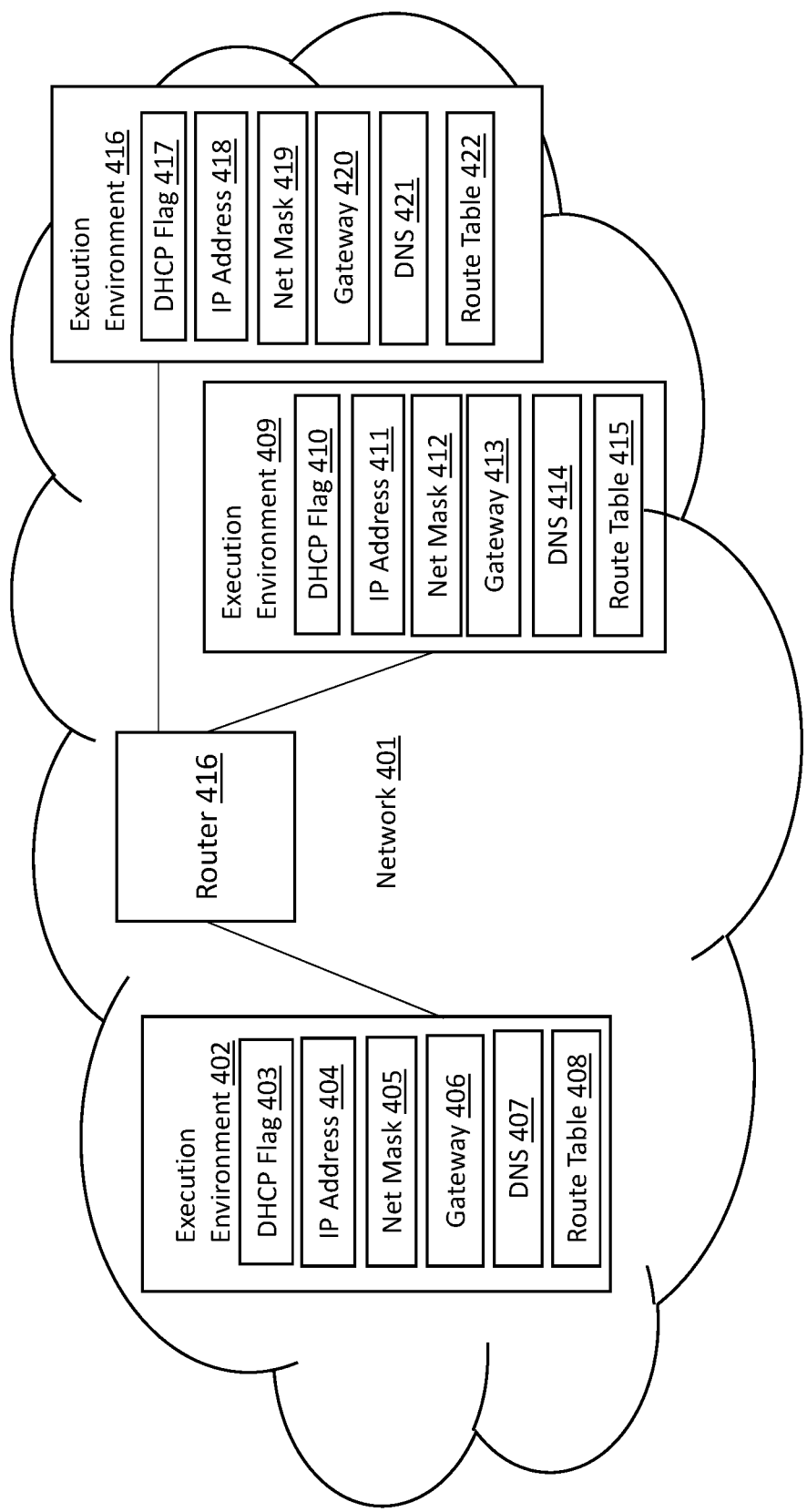
FIG. 4 illustrates an exemplary solution that is made up from multiple execution environments in a network which is using a router to direct network messages, according to some embodiments.

FIG. 4 illustrates an exemplary solution that is made up from multiple execution environments in a network which is using a router to direct network messages, according to some embodiments. This shows network 401 with a router 416 used to direct network messages. It contains execution environment 402, 409 and 416. Execution environment 402 contains attributes DHCP flag 403, IP address 404, net mask 405, gateway 406, DNS 407, route table 408, used to describe how it will interact with the network 401 and router 416. Execution environment 409 contains attributes DHCP flag 410, IP address 411, net mask 412, gateway 413, DNS 414, route table 415, used to describe how it will interact with the network 401 and router 416. Execution environment 416 contains attributes DHCP flag 417, IP address 418, net mask 419, gateway 420, DNS 421, route table 422, used to describe how it will interact with the network 401 and router 416.

FIG. 4 shows three execution environments 402, 409, 416 that are communicating by sending network message FIG. 14 1401 onto the network 401. In this configuration, a network message (e.g., shown in FIG. 14 as 1401) is sent to the router 416 because the gateway 406, 413, 420 is set to the IP address of the router 416. The route table 408, 415, 422 will have a rule entry that causes all default destination IP address (e.g., shown in FIG. 14 as 1403) to be sent to the router 416. The router will then make a decision one which execution environment to send the network message to. Like with the previous example, one can see that if IP address 404 and IP address 411 were set to the exact same value, then there would be a network conflict if execution environment 416 tried to send a network message to that specific IP address.

Figure 5:
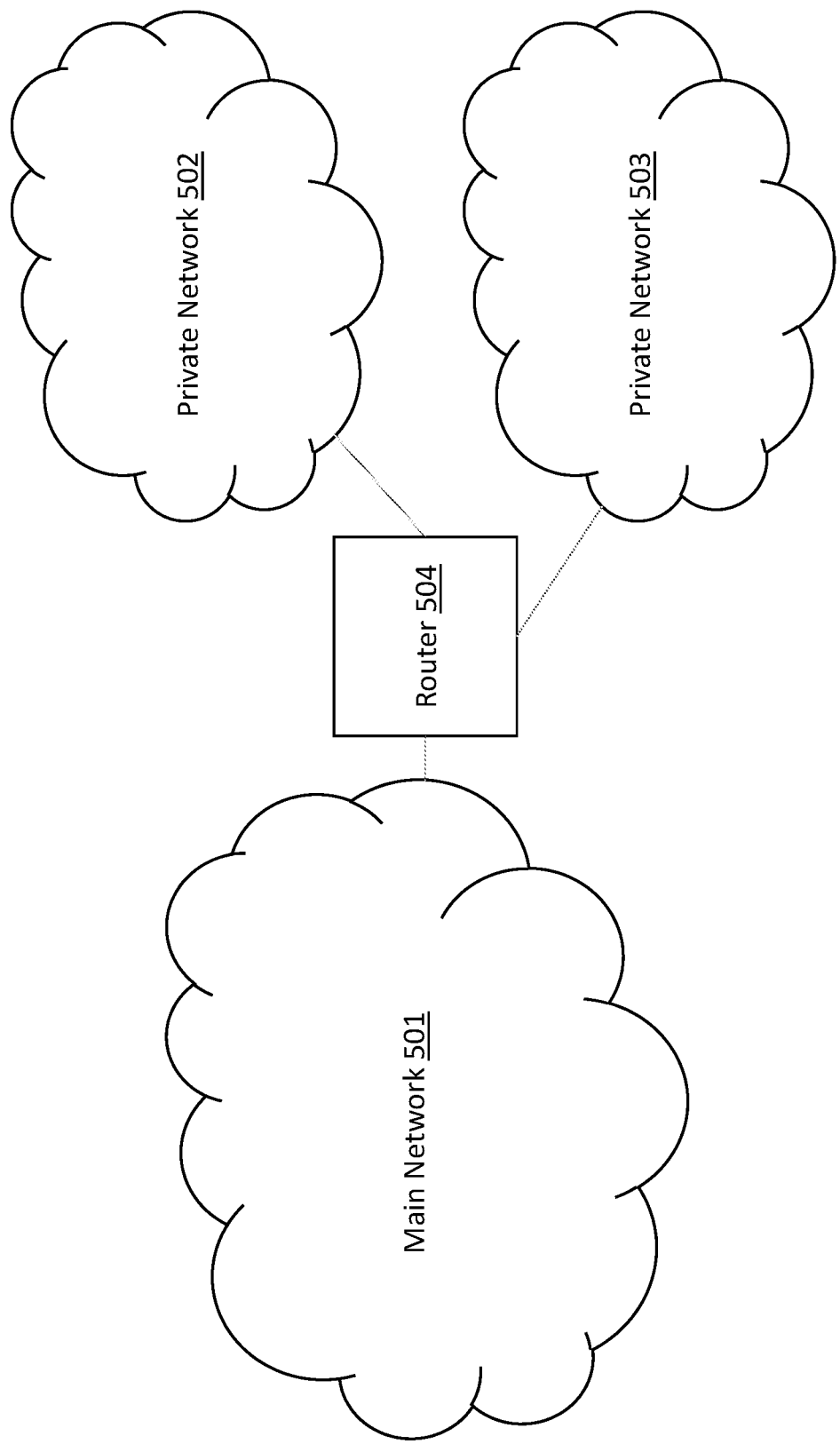
FIG. 5 illustrates an exemplary solution of using multiple private networks independent from the main network, according to some embodiments.

FIG. 5 illustrates an exemplary solution of using multiple private networks independent from the main network, according to some embodiments. This includes the main network 501, using a router 504 that is also connected to private network 502 and 503.

FIG. 5 shows a possible solution to deploy multiple execution environments, which is to create a set of isolated networks, sometimes called private networks 502, 503. For this to work, the main network 501, private network 502 and private network 503 must each have separate IP address spaces (e.g., shown in FIG. 1 as 107). Since there is only a single router 504, it must be able to determine that correct network to send a network message (e.g., shown in FIG. 14 as 1401). The problems with this approach is that you cannot have multiple networks with the same IP address space, so it is possible that the execution environment (e.g., shown in FIG. 2 as 201) would have to be reconfigured and it might not be possible to reconfigure the execution environment. It also often requires the router 504 rules to be modified every time a new network is added to the configuration. This solution typically requires more hardware and software to be constantly added to the environment along with higher levels of administration required to keep it running. Even with all of this, it still cannot guarantee that the execution environment would not have to be reconfigured. It also cannot support having multiple networks with the same IP address space.

Figure 6:
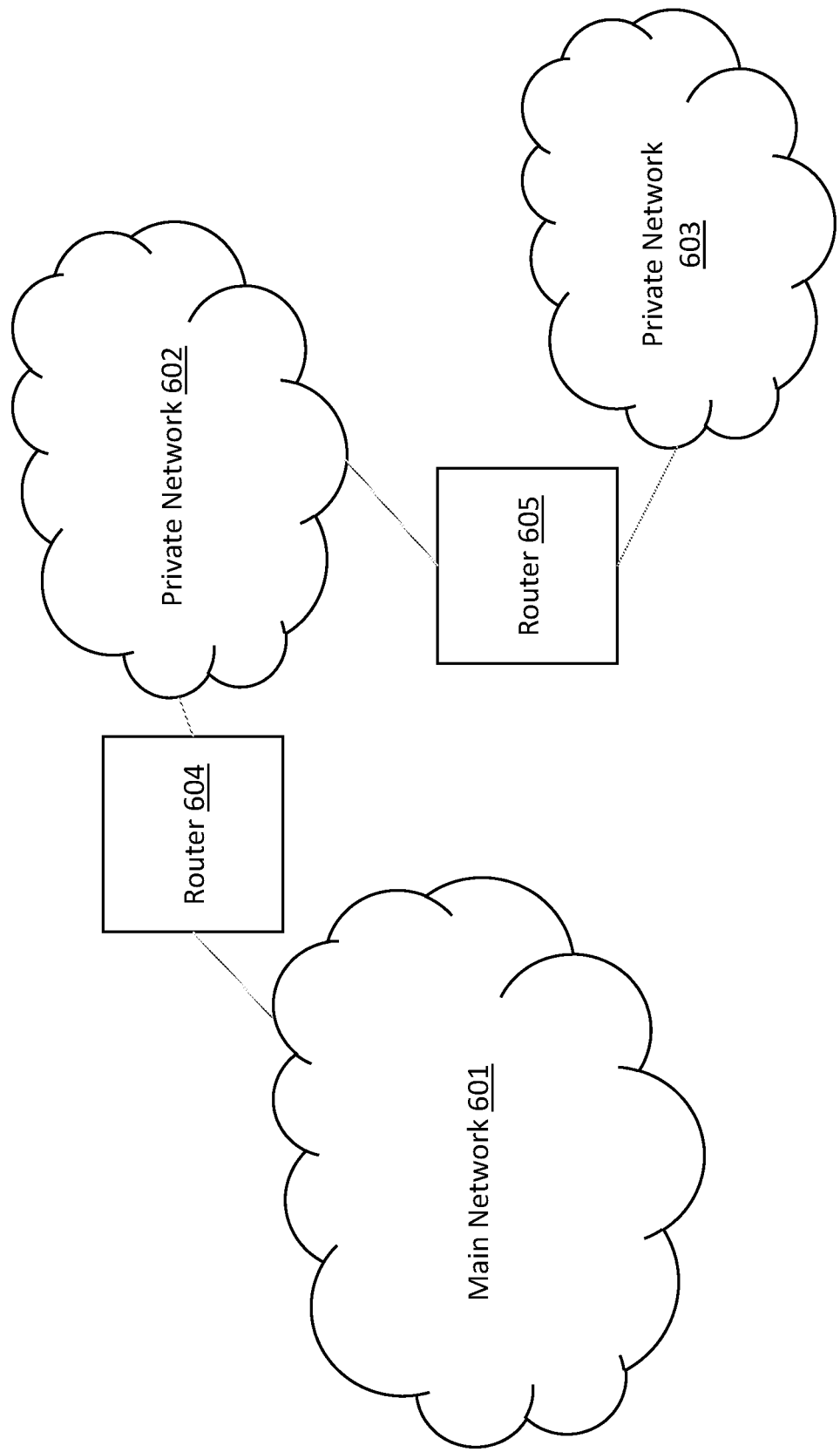
FIG. 6 illustrates an exemplary solution of using multiple private networks and multiple routers to allow the exact same IP address range to be used, according to some embodiments.

FIG. 6 illustrates an exemplary solution of using multiple private networks and multiple routers to allow the exact same IP address range to be used, according to some embodiments. This includes a main network 601 connected to a router 604 which is also connected to private network 602. Private network 602 is connected to router 605 which is also connected to private network 603.

FIG. 6 show another possible solution to the problem (e.g., compared to FIG. 5). In this case, there are two routers 604, 605. This allows private network 603 to have the same IP address space (e.g., shown in FIG. 1 as 107) as the main network 601. It is often that private network 602 has an IP address space that is different from the IP address space of main network 601 and private network 603. By doing this, routers 604 and 605 should not have a network conflict because they are each connected to 2 networks that have different IP address spaces. This solves the issue that FIG. 5 could not solve which is to have the same IP address space in two networks. To do this, another second router 605 needed to be added to configuration along with software and more complex administration. If one wanted to have another network similar to private network 603, they would need to add another router, similar to router 605, to the solution connected to another private network similar to private network 602.

Figure 7:
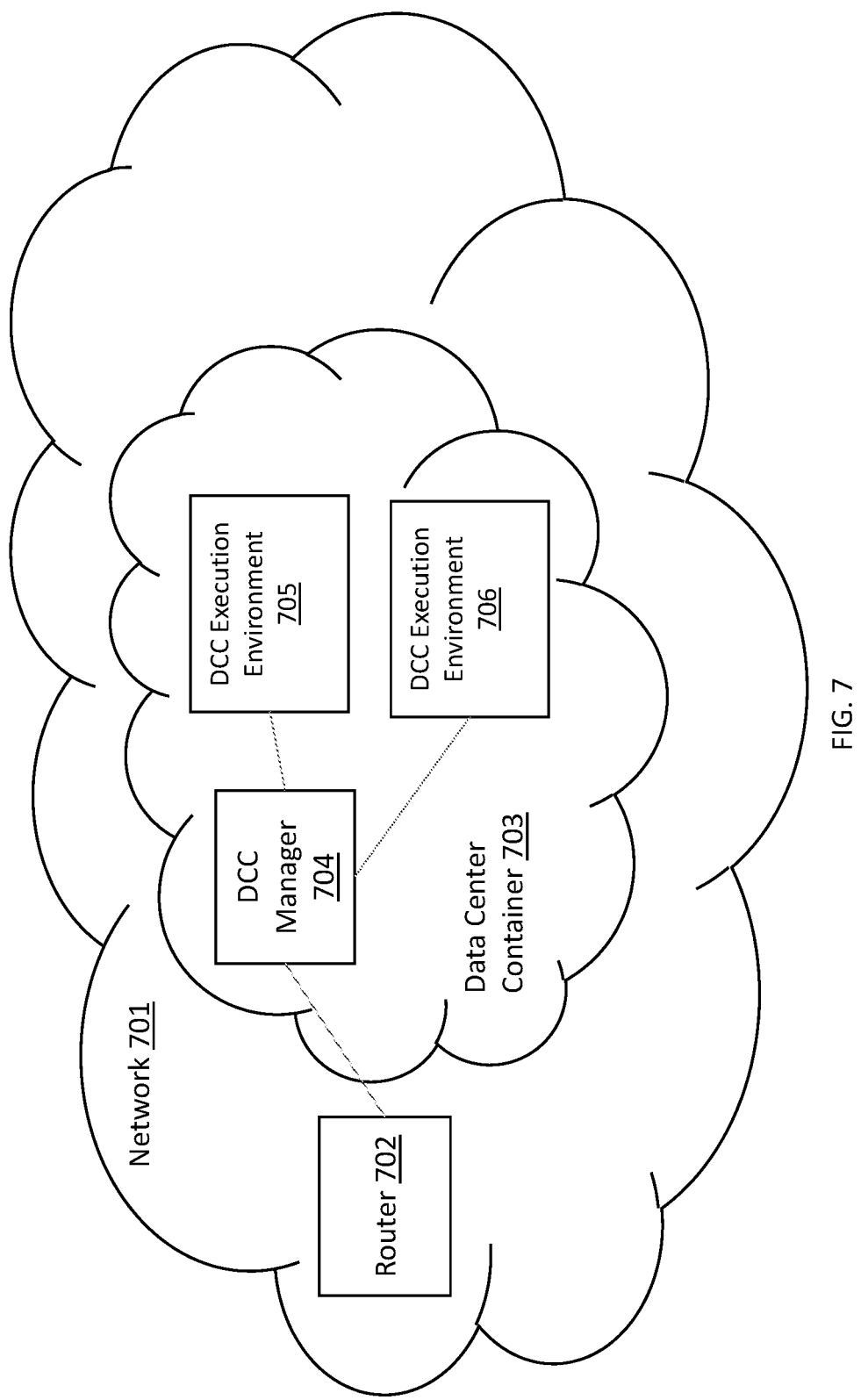
FIG. 7 illustrates an exemplary solution of the data center container and shows the private communication area created inside a network, according to some embodiments.

FIG. 7 illustrates an exemplary solution of the data center container and shows the private communication area created inside a network, according to some embodiments. The environment for a data center container 703 is a network 701, router 702, data center container ("dcc") manager 704, and examples of dcc execution environments 705 and 706.

A data center container 703 exists inside a network 701 (e.g., a pre-existing network, such as a corporate network). A dcc manager 704 connects with the dcc execution environments 705, 706 inside the container and also with the network 701. The connection in the network 701 might be a router 702 but could be other types of network products like switches and hubs. In this configuration, dcc execution environments 705 and 706 are completely isolated from the other execution environments in the network 701. All communication for dcc execution environments 705 and 706 go through dcc manager 704. The dcc manager 704 is responsible to provide communication between dcc execution environments 705 and 706 along with any communication to and from execution environments in network 701 to and from dcc execution environments 705 and 706. This creates a level of isolation similar to that as shown in FIG. 5 as private networks 502 and 503. It will also be described how further isolation as shown in FIG. 6 private network 603 can also be achieved using data center containers without any network conflicts. The result of using a data center container 703 is to be able to have private networks with isolation that even can have IP addresses (e.g., shown in FIG. 2 as 203) or IP address spaces (e.g., shown in FIG. 1 as 107) that may be duplicated in other data center containers or in the network 701 without any network conflicts as previously described in the description of FIG. 3 and FIG. 4.

Figure 10:
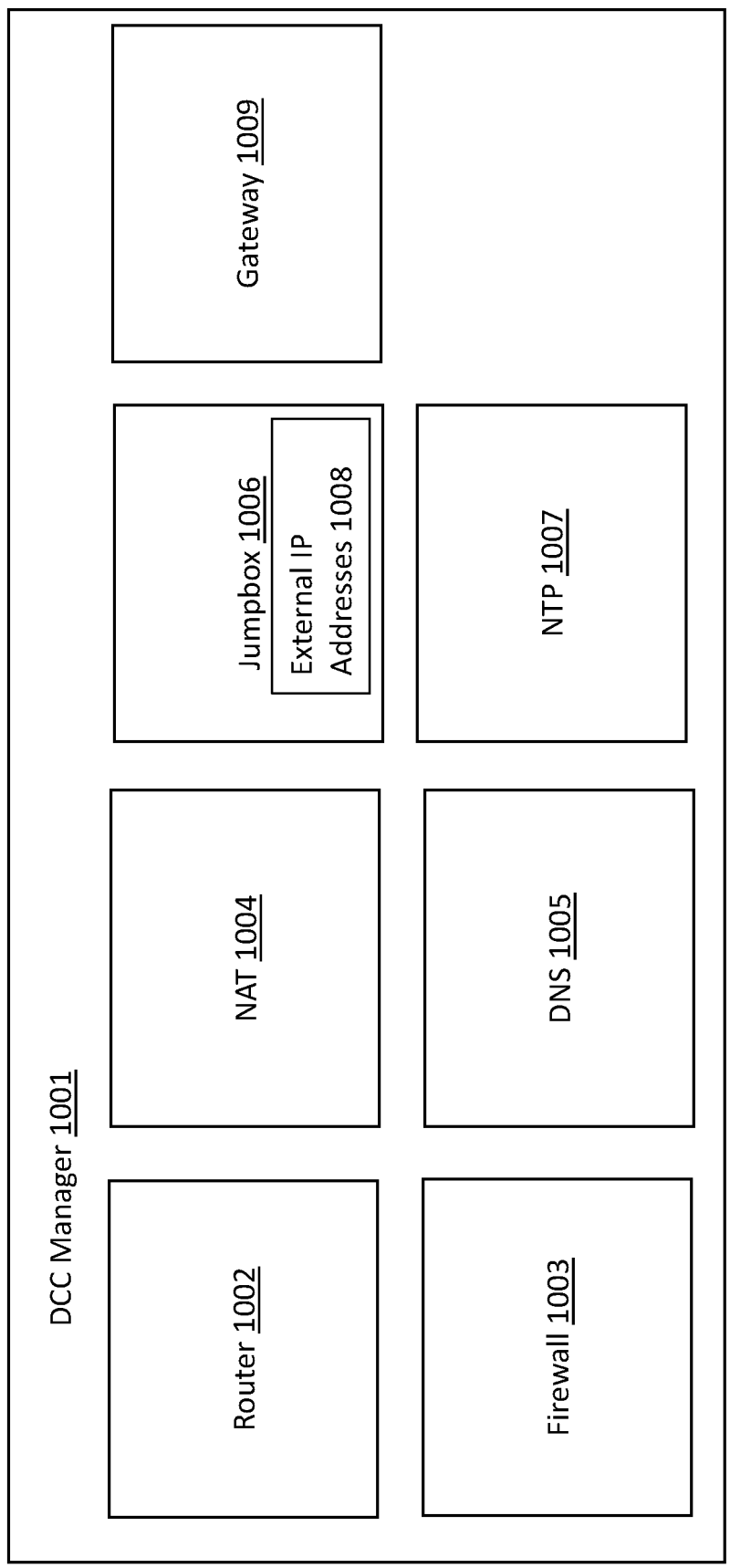
FIG. 10 illustrates an exemplary solution of the data center container manager which provides a set of services (router, firewall, NAT, DNS, Jumpbox and NTP) normally found in a network, according to some embodiments.

FIG. 10 illustrates an exemplary solution of the data center container manager 1001 which provides a set of services of router 1002, firewall 1003, NAT 1004, DNS 1005, Jumpbox 1006, with external IP addresses 1008, NTP 1007 and gateway 1009 that are normally found in a network, according to some embodiments.

Figure 9:
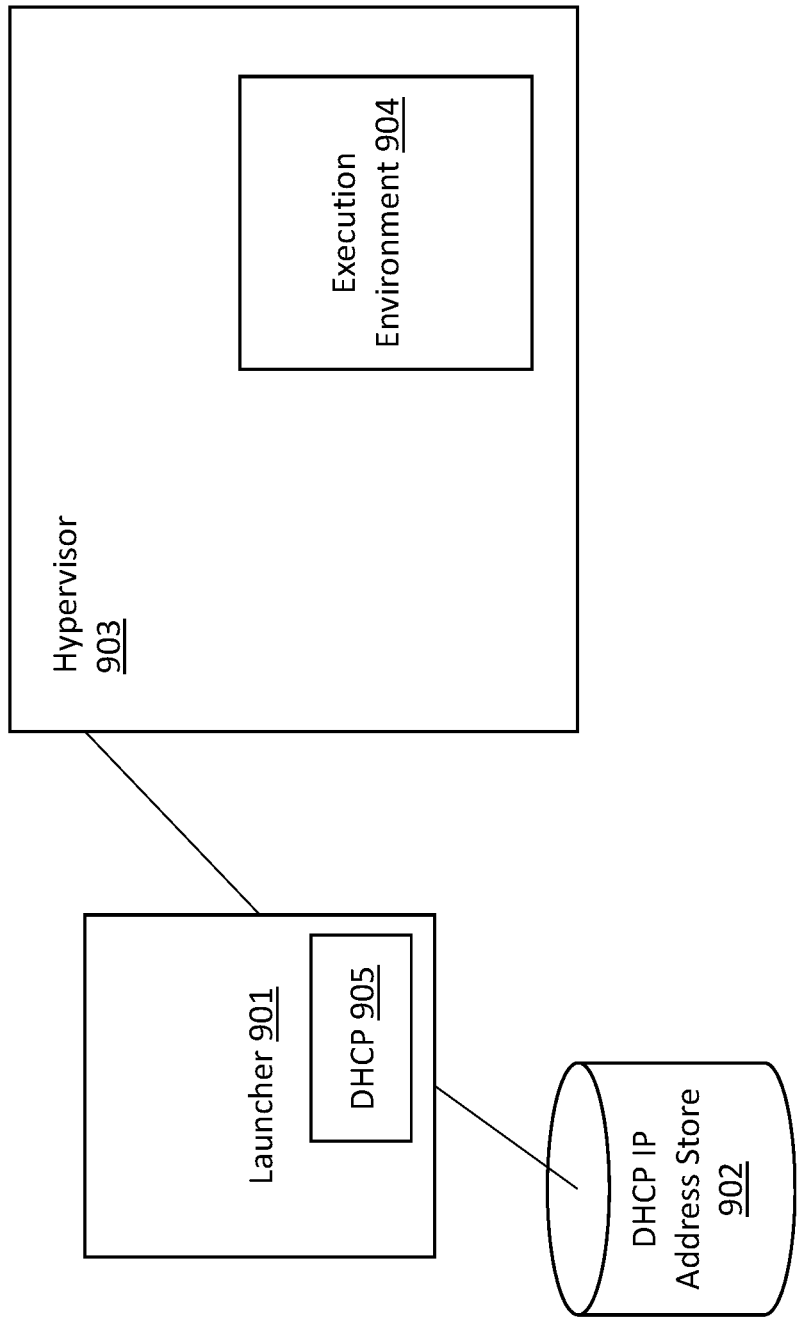
FIG. 9 illustrates an exemplary solution showing the launcher software providing the DHCP network service normally provided in a network, according to some embodiments.

FIG. 10 further shows how a data center container (e.g., shown in FIG. 7 as 703) works. The next step in understanding how a data center container works is to look at what is inside the dcc manager 1001. In FIG. 1, it was shown and described in detail, a set of network services typically found in a network 101. FIG. 10 shows the same set of services inside the dcc manager 1001 rather than inside the network. In this way, the dcc manager 1001 is responsible to create the data center container and make it appear to be a network inside the network 701. The functions of the router 1002, NAT 1004, Firewall 1003, DNS 1005, NTP 1007 and gateway 1009 are similar and/or the same as described in FIG. 1 and will therefore not be repeated. There are a few notable differences between the network services described in FIG. 1 and the network services inside a dcc manager 1001. One difference is the jumpbox 1006 service along with the external IP addresses 1008. Another difference is the DHCP shown in FIG. 1 as 102 is not included. FIG. 9 below will describe how the DHCP is provided inside a data center container. The jumpbox 1006 (e.g., which can be read about at http://en.wikipedia.org/wiki/Jump_server) is another network service that is typically used to provide access to devices in a separate security zone of a network or parts of the network that are isolated from other parts, as found with a data center container. In a data center container, the jumpbox 1006 provides access from execution environments outside the data center container to execution environments inside the data center container. This can be accomplished by using a well-known technique of IP aliasing (e.g., which can be read about at http://en.wikipedia.org/wiki/IP_aliasing) which creates multiple IP addresses on the same network interface. These are used as the external IP addresses 1008 and are available on the network (e.g., shown in FIG. 7 as 701). The router 1002, using rules, accepts network messages (e.g., shown in FIG. 14 as 1401) from the network using an external IP address and sends them to an execution environment, such as that shown in FIG. 7 at 705 inside the data center container 703.

FIG. 9 illustrates an exemplary solution showing the launcher 901 software providing the DHCP 905 network service (e.g., normally provided in a network FIG. 1 102), according to some embodiments. This includes a launcher 901, providing the DHCP 905 service which uses the DHCP IP address store 902. This figure includes a hypervisor 903 which has an execution environment 904 running in it.

In the previous description of the services inside a dcc manager FIG. 10, it did not include a DHCP network service (e.g., as described in FIG. 1 as 102 in network 101). The reason is that DHCP services are sent broadcast messages on the network (e.g., FIG. 7 at 701). A broadcast message (e.g., which more can be read about at http://en.wikipedia.org/wiki/Broadcasting_(networking)) is sent to all execution environments on the network simultaneously. This means that one typically cannot have multiple DHCP servers on the same network without having them coordinated. Otherwise, the DHCP server that responds to the broadcast could be thought of as random. It is typically desirable for data center containers to use the DHCP 905 service, because it is providing special IP addresses. If an execution environment did a broadcast and the standard DHCP server responded, then the execution environment may not be made part of the data center container. To control this when creating the data center container (e.g., shown in FIG. 7 at 703) and the execution environments (e.g., shown in FIG. 7 as 705, 706) inside the data center container, the IP address set up can be done by the launcher 901 (e.g., a static IP address approach as described in the FIG. 2 description). This approach can create the illusion of having a DHCP network service, even though it is implemented during the configuration of the execution environment. The DHCP 905 service is implemented inside the launcher 901. The DHCP 905 service gives out IP addresses to execution environments as their network is being configured. The DHCP 905 service keeps track of the IP addresses that have been given out in the DHCP IP address store 902. The launcher 901 is software that communicates with a hypervisor 903 (e.g., which can be read about at http://en.wikipedia.org/wiki/Hypervisor and an example would be VMware ESXi server). The communication will be used to configure an execution environment 904 before powering it on. This approach still allows IP addresses to be automatically assigned to execution environments even though they now received as part of the DHCP broadcast protocol. The implementation of the DHCP 905 service inside the launcher 901 software provides the last network service needed that was described as part of FIG. 1.

Figure 8:
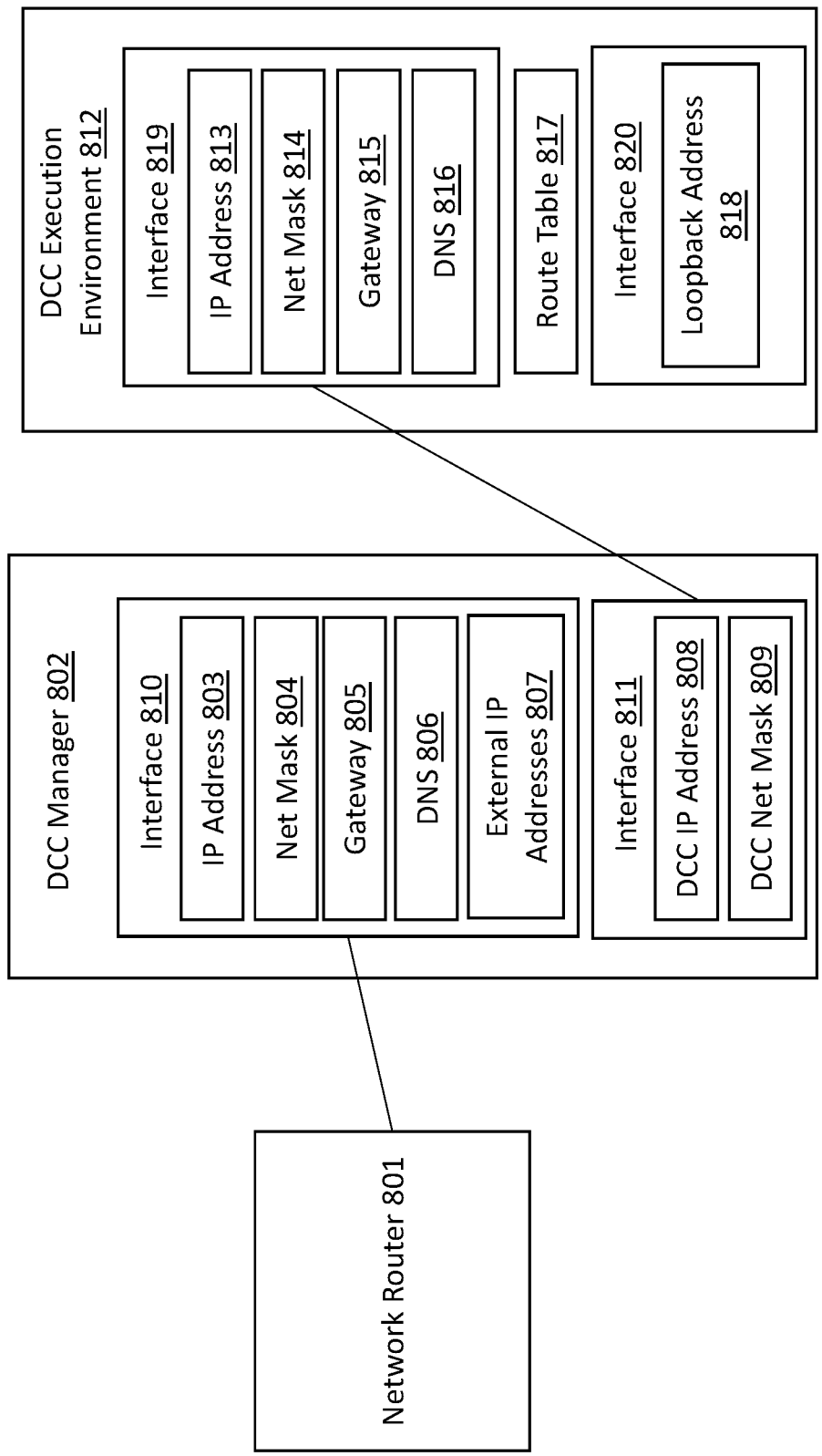
FIG. 8 illustrates an exemplary solution of how communication is mapped to different address spaces inside the data center container, according to some embodiments.

FIG. 8 illustrates an exemplary solution of how communication is mapped to different address spaces inside the data center container, according to some embodiments. This includes a network router 801, dcc manager 802 which has interface 810 which includes IP address 803, net mask 804, gateway 805, DNS 806, external IP addresses 807. It also has interface 811 which includes dcc IP address 808 and dcc net mask 809. The figure also includes a dcc execution environment 812 which has interface 819 which includes IP address 813, net mask 814, gateway 815, DNS 816, route table 817 and loopback address 818.

FIG. 8 represents the next step deeper into understanding how a data center container FIG. 7 703 works. FIG. 8 shows how the network is configured inside the dcc manager 802 and dcc execution environment 812. FIG. 2 represented the attributes required for the network at a higher level. The attributes are associated with interfaces 810, 811 and 819. The interfaces 810, 811 and 819 can also be called NICs, network interface cards or network interface controllers (e.g., which can be read about at http://en.wikipedia.org/wiki/Network_interface_controller) and also has a number of names that all mean the same thing. The interface 820 loopback is sometimes called the loopback interface or virtual loopback interface (e.g., which can be read about at http://en.wikipedia.org/wiki/Loopback).

FIG. 8 is showing the relationships of the different interfaces 810, 811, 819, 820 with each other, and will be described in conjunction with FIG. 7 for illustrative purposes. The network router 801 exists, e.g., inside the network shown in FIG. 7 at 701. The network router 801 could also be a network switch or network hub. Interface 810 connects the dcc manager 802 to the network router 801 in network FIG. 7 701. In this figure, the interfaces 810, 811, 819 do not include a DHCP flags as shown in FIG. 2 202 but could be done that way in other embodiments.

Because there are no DHCP flag (e.g., shown in FIG. 2 as 202), the IP address 803, 808, 813 and net mask 804, 809, 814, gateway 805, 815, DNS 806, 816 will be done using a static approach (e.g., which can read about at http://en.wikipedia.org/wiki/IP_address#Static_IP) which means that rather than having a DHCP (e.g., shown in FIG. 1 as 102) network service provide the IP address (e.g., FIG. 1 at 108), the IP address 803, 808, 813 and net mask 804, 809, 814, gateway 805, 815, DNS 806, 816 will be specified statically. IP address 813, net mask 814, gateway 815, DNS 816 will be handled statically as viewed by the software inside the dcc execution environment 812. The actual assignment will occur using the DHCP (e.g., in FIG. 9 as 905) network service that is implemented inside the launcher (e.g., FIG. 9 as 901). Interface 810 will have an IP address 803, net mask 804, gateway 805 address of the gateway (e.g., FIG. 1 at 104) network service, one or more DNS 806 addresses of the DNS (e.g., FIG. 1 at 103) network service and a set of external IP addresses 807, e.g., as described in FIG. 10 1008.

The dcc manager 802 has another interface 811 that is used to communicate with dcc execution environments, such as 812. When having more than one interface 810, 811 in a single execution environment like the dcc manager 802, only the first interface 810 has a gateway 805 and DNS 806 entry. The dcc manager 802 has a dcc IP address 808 and dcc net mask 809 that is different from the IP address 803 and net mask 804. These attributes 805, 806 are used in the operation of interface 810. Interface 811 only needs to have an IP address and net mask which are represented as dcc IP address 808 and dcc net mask 809. The interface 811 is used to communicate with interface 819 in dcc execution environment 812.

Figure 11:
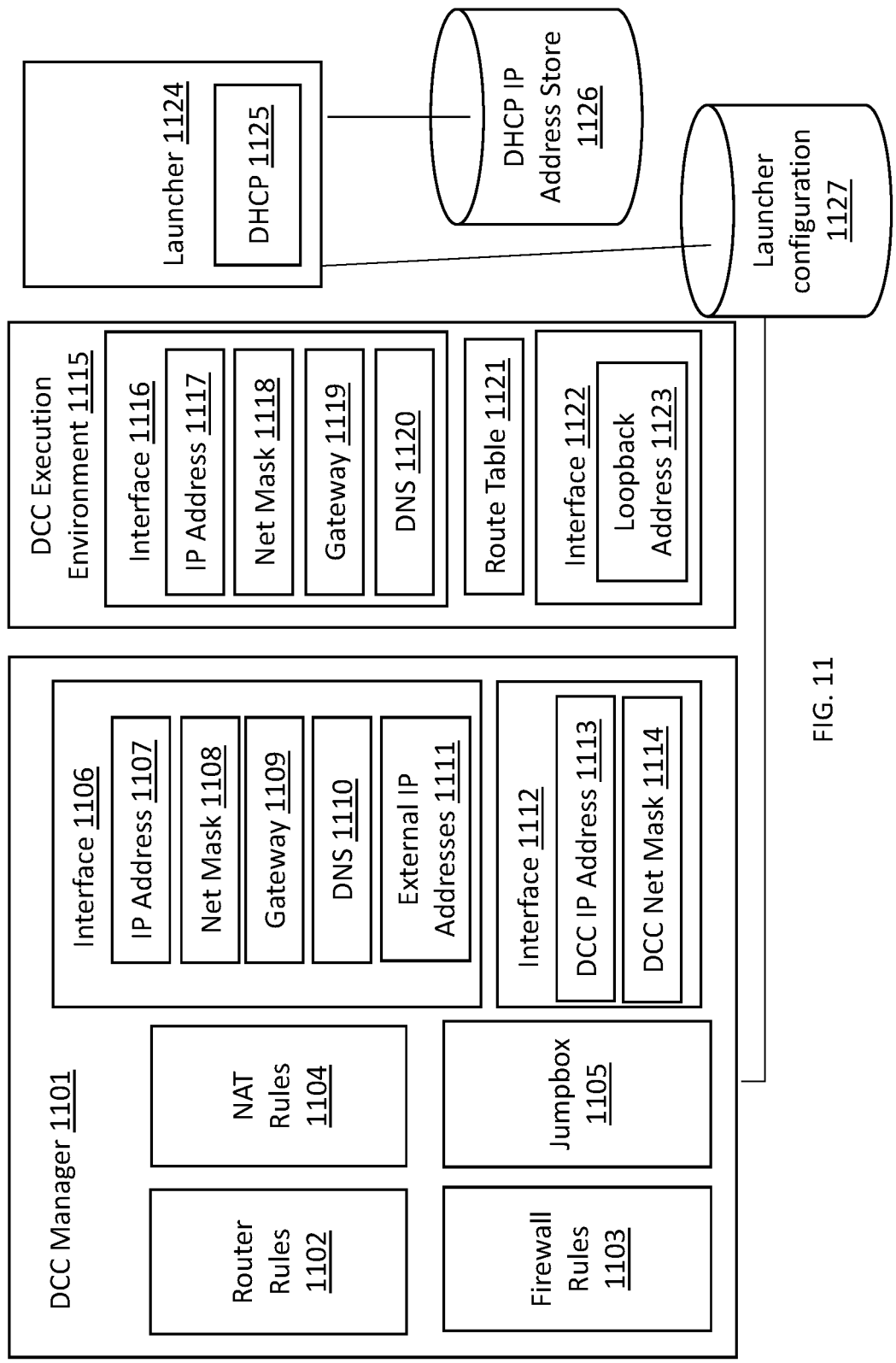
FIG. 11 illustrates an exemplary set of rules tables and IP attributes that are modified to enable the data center manager to control the communication, according to some embodiments.

FIG. 11 illustrates an exemplary set of rules tables and IP attributes that are modified to enable the data center manager to control the communication, according to some embodiments. FIG. 11 includes a dcc manager 1101 that has rule tables of router rules 1102, firewall rules 1103, and NAT rules 1104. The dcc manager 1101 also includes the jumpbox 1105 rules to create external IP addresses 1111. The dcc manager 1101 includes network interface 1106 which has IP address 1107, net mask 1108, gateway 1109, DNS 1110 and external IP addresses 1111. The dcc manager 1101 includes network interface 1112 which includes dcc IP address 1113 and dcc net mask 1114. FIG. 11 also includes a dcc execution environment 1115. The launcher 1124, implementing the DHCP 1125 network service, using the DHCP IP address store 1126 and launcher configuration 1127 will modify the IP address 1117, net mask 1118, gateway 1119, DNS 1120 to set up the interface 1116 in dcc execution environment 1115. The launcher 1124 will modify the rules for router table 1121 and modify the loopback address 1123 of interface 1122 for dcc execution environment 1115.

Each data center container (e.g., FIG. 7 at 703) has its own dcc manager 1101. The goal of the configuration is to make sure that communications between any dcc execution environments 1115 in the same data center container go through the dcc manager 1101. In that way, the dcc manager 1101 essentially behaves like a router (e.g., FIG. 4 416 in a network FIG. 4 401). Because the dcc manager 1101 can have control over network messages for the data center container, the dcc execution environments 1115 that are associated with the specific dcc manager 1101 can be in an isolated communication environment, even though they are executing in a network (e.g., FIG. 4 at 416). To accomplish this, the techniques described herein can be implemented throughout the network configuration areas (e.g., that have been discussed up to this point).

In some embodiments, the dcc manager 1101 for a specific data center container FIG. 7 703 can be running prior to a dcc execution environment 1115 starting. The dcc manager 1101 has a network interface 1106 that is used to connect to the network (e.g., FIG. 4 at 416). The IP address 1107, net mask 1108, gateway 1109 and DNS 1110 can be configured using a number of known approaches. For this discussion, they will be statically defined as discussed previously, but a person of skill in the art can appreciate that this is for exemplary purposes only. The network interface 1112, which has dcc IP address 1113 and dcc net mask 1114, defines that network IP address space (e.g., FIG. 1 at 107) that will be used for this specific data center container. Notably, in this example, the IP address space defined for the data center container is an unused IP address space in the network (e.g., FIG. 4 at 416). For this discussion, they will be statically defined as discussed previously. Since only the dcc manager 1101 may exist at this point, the router rules 1102 and NAT rules 1104 can all both blank. The jumpbox 1105 network service, using the external IP addresses 1111 may not have any external IP addresses 1111 defined. The firewall rules 1103 network service can be pre-loaded with rules. The firewall rules 1103 start with not allowing any network message (e.g., FIG. 14 at 1401) to pass through the dcc manager 1101. One can add various exemplary rules. One can add rules that allow network messages FIG. 14 1401 with specific source IP address 1402 to be passed on. One can add rules that allow network messages FIG. 14 1401 with specific destination IP address 1403 to be passed on. One can add rules that allow network messages FIG. 14 1401 with different combinations of source IP address 1402 and destination IP address 1403 to be passed on. One can even use patterns to specify the source IP address 1402 and destination IP address 1403 that will be allowed to be passed on. One can specify ports (e.g., which can be read about at http://en.wikipedia.org/wiki/List_of_TCP_and_UDP_port-_numbers) and protocols (e.g., which can be read at http://en.wikipedia.org/wiki/Internet_protocol_suite) that are allowed to be passed on. Such ports and/or protocols are well known by people in the industry.

The launcher configuration 1127 contains a copy of the dcc IP address 1113 and dcc net mask 1114 which is used by the DHCP 1125 network service to configure interface 1116, router table 1121 and interface 1122. From the information in the launcher configuration 1127, it can determine the IP address space (e.g., FIG. 1 at 107) of the data center container (e.g., FIG. 7 at 703). The launcher 1124 also knows which IP address (e.g., FIG. 1 at 108) of the IP address space has been used, because that is the dcc IP address 1113. The net mask 1118 of interface 1116 must match the dcc net mask 1114 for the dcc execution environment 1115 interface 1116 to communicate with dcc manager 1101 interface 1112. The gateway 1119 address and DNS 1120 address will be set to be the same as dcc IP address 1113. In this way, the dcc execution environment 1115, interface 1116 will use the dcc manager 1101 as its gateway (e.g., FIG. 10 at 1009) network service and DNS (e.g., FIG. 10 at 1005) network service. The route table 1121 rules can be modified so all network messages are directed to the gateway 1119 IP address which can be set to the same value as the dcc IP address 1113. In some network implementations, the route table 1121 can allow dcc execution environments 1115 to communicate directly with each other. This can be removed so all communication is done through the dcc manager 1101 using the value of dcc IP address 1113 as the gateway 1119 IP address.

The launcher 1124, using its DHCP 1125 network service, can assign an IP address 1117 and net mask 1118 to interface 1116 for dcc execution environment 1115. In some examples, the dcc execution environment cannot use the DHCP service provided by network (e.g., FIG. 1 at 102) because it works with IP address space (e.g., FIG. 1 at 107) providing IP addresses (e.g., FIG. 1 at 108). If that was done then dcc execution environment 1115 interface 1116 would not be isolated from all other communications of the network. The DHCP 1125 network service as part of the launcher 1124 will look at the launcher configuration 1127 to determine the IP address space (e.g., FIG. 1 at 107) that should be used. The DHCP 1125 network service will also look in the DHCP IP address store 1126 to see what IP addresses (e.g., FIG. 1 at 108) have already been given out. It will select an unused IP address from the IP address space (e.g., FIG. 1 at 107) and record that it is used in the DHCP IP address store 1126. This IP address will then be used for the IP address 1117. The net mask 1118 will be set to be the same value as dcc net mask 1114.

Before setting the IP address 1117, if the launcher 1124 finds that dcc execution environment 1115 planned on using a specific IP address statically defined, it will configure the loopback address 1123 on interface 1122 to have that specific static IP address. The selected IP address 1117 plus the loopback address 1123 are recorded in the launcher configuration 1127. In some embodiments, the original static value of IP address 1117 is preserved and assigned as a loopback address 1123, e.g., because some dcc execution environments 1115 will try to communicate with their own IP address 1117 to check if the network is available. With the loopback address 1123 set to the original static value of IP address 1117, the dcc execution environment should still work correctly.

The dcc manager 1101 is monitoring the launcher configuration 1127 for new data being written to it. When it finds new data, it will proceed to create the necessary router rules 1102, NAT rules 1104 and an external IP address 1111 for jumpbox 1105.

The jumpbox 1105 network service is handled first. The can be done first to create a new external IP address 1111. This can be done, for example, by doing IP aliasing (e.g., which can be read about at http://en.wikipedia.org/wiki/IP_aliasing), which allows one to have more than one IP address associated with network interface 1106. From outside of dcc manager 1101, it looks like there are multiple IP addresses but they all go to the same interface 1106. When a network message FIG. 14 1401 arrives, the destination IP address 1403 will contain one of the external IP addresses 1111 creating using IP aliasing. The jumpbox 1105 network service will then write the new external IP address 1111 into the launcher configuration 1127.

The launcher configuration 1127, for each dcc execution environment 1115 created, has an IP address 1116, external IP address 1111 and optionally a loopback address 1123. The last operation to set up the communication for a dcc execution environment 1115 is to create the router rules 1102 and NET rules 1104. When implementing a dcc manager 1101 on a Linux Operating System, one can use a program called iptables (e.g., which can be read about at http://en.wikipedia.org/wiki/iptables) to configure a sophisticated kernel based firewall. This can be used for both the firewall and routing functions needed for the dcc manager 1101. In different operating system, the functions required may be separated, so they have been discussed separately herein but need not be implemented separately. In the class of router rules 1102, the dcc manager 1101 needs to look at all the dcc execution environment 1115 entries in the launcher configuration 1127 and make sure there are router rules 1102 created that allow the IP address 1117 from each dcc execution environment 1115 to communicate with each other. These rules can essentially say allow one IP address to communicate with another IP address when the network messages (e.g., FIG. 14 at 1401) are passing through the dcc manager 1101.

With a possible set of three IP address (e.g., IP address 1117, loopback address 1123 and external IP address 1111) per dcc execution environment, one could end up with a very large router rules 1102 set. A technique that can be used to reduce this (e.g., and to allow networks to work correctly), is the NAT rules 1104. NAT rules 1104 were discussed above. To recap, referring to FIG. 14 for example, the basic concept is that they allow one to change the source IP address FIG. 14 1402 and/or the destination IP address FIG. 14 1403 in a network message FIG. 14 1401. With a data center container, the possible IP addresses that can be used may not be understood in the different networks. For example, when in network FIG. 7 701, the external IP addresses 1111 are understood by the network FIG. 7 701. Inside the data center container FIG. 7 703, the dcc IP address 1113 and IP address 1117 are understood by the data center container network FIG. 7 703.

To illustrate this point, referring to figures above as an example, we can create a network message FIG. 14 1401 and set the destination IP address 1402 to an execution environment FIG. 3 302. This exists outside of the data center container. The source IP address 1403 would be set to the sender of the network message 1401. In this example, the source IP address 1403 would be set to the value of IP address 1117. If the firewall rules 1103 and router rules 1102 allow the network message FIG. 14 1401 to pass through the dcc manager 1101 from the data center container FIG. 7 703 to the network FIG. 7 701 it will be received by execution environment FIG. 3 302. After receiving the network message FIG. 14 1401, it would then need to reply. When a network message FIG. 14 1401 is received, the reply is created by copying the source IP address 1402 to the destination IP address 1403 and the original destination IP address 1403 to the source IP address 1402. Now the network message 1401 can be sent back to the original sender. In this example, the original sender was a dcc execution environment 1115 with IP address 1117. There is no information in network FIG. 7 701 that can tell it that network messages FIG. 14 1401 with a destination IP address FIG. 14 1403 inside the data center container DIF. 3 302 can be reached by using the dcc manager 1101 as the gateway.

To address this point, when the first network message FIG. 14 1401 is sent, the NAT rules 1104 can be used to modify the source IP address FIG. 14 1402 so that it would look like it is sent from external IP address 1111 that is associated with dcc execution environment 1115 as specified in launcher configuration 1127. The rule would say any network message FIG. 14 1401 with a source IP address FIG. 14 1402, would be changed to their associated external IP address 1111. When the network message FIG. 14 1401 is used to reply with, the source IP address FIG. 14 1402 will contain an IP address that is understood in network FIG. 7 701 and the message would be delivered to dcc manager 1101. A network message FIG. 14 1401 with a destination IP address FIG. 14 1403 equal to an external IP address 1111 cannot be delivered to the proper destination because it has an IP address 1117. Thus, for example, another NAT rule 1102 is created that would be used to modify the destination IP address FIG. 14 1403. In this exemplary case, it would say any network message FIG. 14 1401 with a destination IP address of external IP address 1111 would be changed, according to the associations in launcher configuration 1127, to IP address 1117.

The last IP address to look at in this example is the loopback address 1123. This address is on a network interface 1122 and only exists inside the specific dcc execution environment 1115. This is a powerful feature because it can be used to create IP addresses that already exist in the network FIG. 3 301. Making the loopback address 1123 available to all the dcc execution environments 1115 inside the data center container FIG. 7 703, is another example on how all the dcc execution environments 1115 are isolated from all other execution environments in the network FIG. 3 301. Loopback addresses 1123 are only available to be used for dcc execution environments 1115 using the same dcc manager 1101. If dcc execution environment 1115 executes a ping (e.g., which can be read about at http://en.wikipedia.org/wiki/Ping_(networking_utility)) the interface 1122 will respond as if a ping network message left the dcc execution environment 1115. With a loopback address 1123 interface 1122, the ping network message never leaves the dcc execution environment 1115 and returns success. It is often a common practice in the industry to use ping as a way to test if the network interface is active. Using this approach can allow the dcc execution environment 1115 to not be changed and yet still act as if the IP address 1117 is was it was previously set to. In this exemplary case, the loopback address 1123 is set to that value so an internal communication using ping will return success. If the dcc execution environment FIG. 7 705 wanted to communicate with a different execution environment FIG. 7 706 using the values set in the loopback addresses, the NAT rules 1104 would be used. The dcc execution environment FIG. 7 705 would send a network message FIG. 14 1401. The source IP address FIG. 14 1402 would be set to the value of the IP address 1117. The destination IP address FIG. 14 1403 would be set to the loopback address 1123 of the dcc execution environment FIG. 7 706. The network message FIG. 14 1401 will then be sent to the dcc manager 1101. The NAT rules 1104, based on information in the launcher configuration 1127, will change the destination IP address FIG. 14 1403 to be the IP address 1117 of dcc execution environment FIG. 7 706. This would then be delivered to the correct execution environment. When dcc execution environment FIG. 7 706 replies, it creates a new network message FIG. 14 1401 and sets the source IP address to its own IP address 1117 and the destination IP address is set to the value the network message FIG. 14 1401 source IP address FIG. 14 1402 was set to. This is then passed to the dcc manager 1101 and message does not need any changes before delivery.

Figure 12:
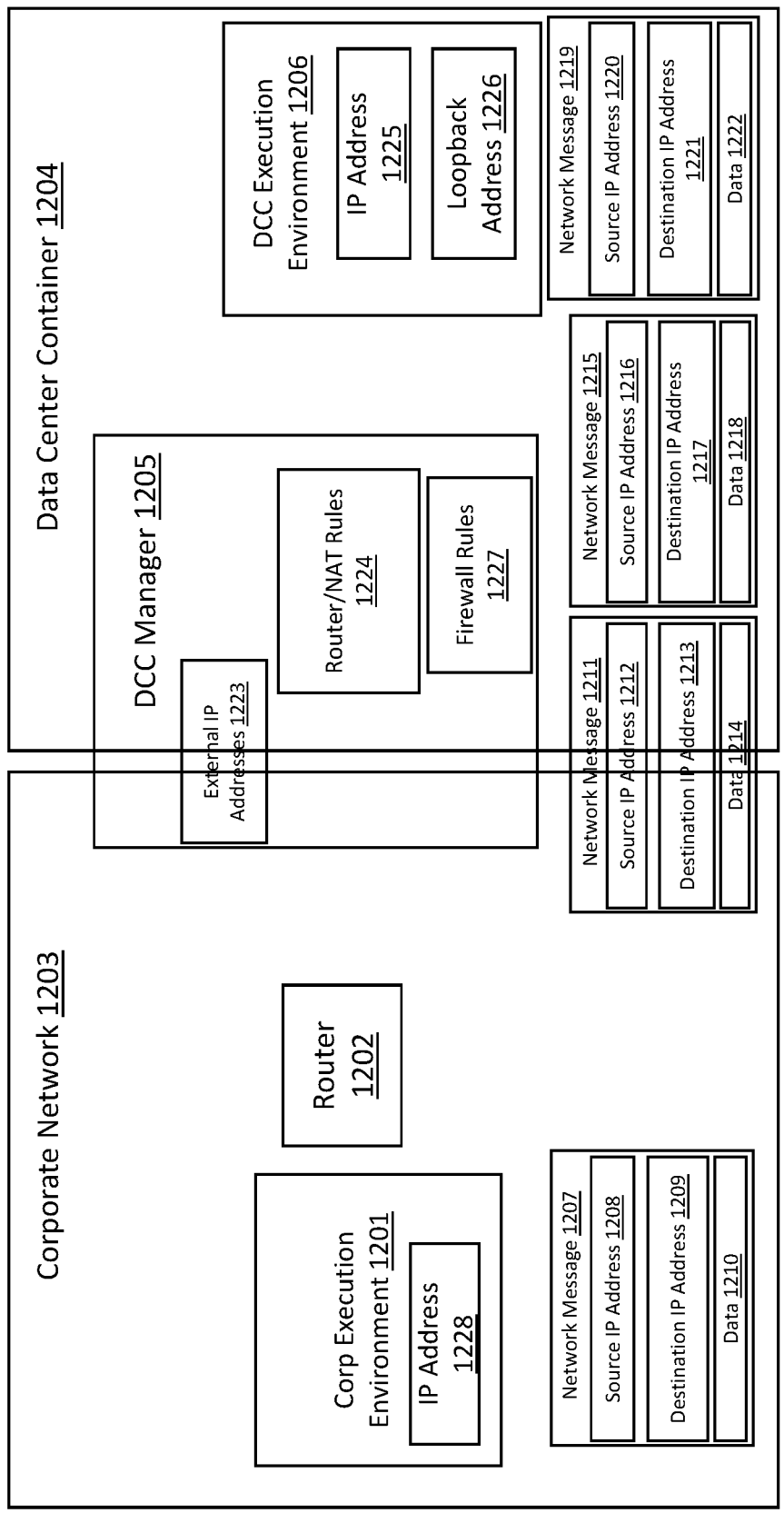
FIG. 12 illustrates an exemplary solution of the data center container and how network messages will flow and change, according to some embodiments.

The data center container techniques described herein can therefore be used to create a private network inside an existing network with IP addresses that are duplicates and yet still work correctly and not affect any other network operations. One example of use is to create duplicate test environments of existing environments. Another example is to move part of an existing environment to another network and still have it work and communicate with the remaining part of the environment. FIG. 12, explained next, is used to provide an exemplary walkthrough of a network message through some of the parts of the techniques described herein.

FIG. 12 illustrates an exemplary solution of the data center container and how network messages will flow and change, according to some embodiments. FIG. 12 includes a corporate network 1203 which includes a corp execution environment 1201 and router 1202. Corp execution environment 1201 includes IP address 1228. It also shows a network message 1207 which includes a source IP address 1208, destination IP address 1209 and data 1210. This network message 1207 will be used to show an example of message flow through the data center container to a corporate network. FIG. 12 includes a data center container 1204, which includes a dcc execution environment 1206. The dcc execution environment 1206 has an IP address 1225 and loopback address 1226. The data center container 1204 also includes a dcc manager 1205 which has external IP addresses 1223 and Router/NAT rules 1224 and firewall rules 1227. The data center container 1204 also includes network message 1211 with source IP address 1212, destination address 1213 and data 1214. It also includes network 1215 with source IP address 1216, destination IP address 1217 and data 1218. It also includes network message 1219 with source IP address 1220, destination IP address 1221 and data 1222.

The dcc manager 1205 is shown partly in the data center container 1204 and partly in the corporate network 1203 because it has an interface in each network similar to dcc manage FIG. 11 1101. The diagram will show how a network message is modified as it moves from a data center container 1204 to a corporate network 1203 and from a dcc execution environment 1206 to a corp execution environment 1201. Dcc execution environment 1206 would like to send a network message (e.g., FIG. 14 1401) to corp execution environment 1201. Dcc execution environment 1206 creates network message 1219 and sets the source IP address 1220 to IP address 1225. It also sets the destination IP address 1221 to IP address 1228. The data 1222 is not important to the movement and change of addressing of the network message 1219. Network message 1219 is sent to the dcc manager 1205. Network message 1215 represents the message received from dcc execution environment 1206. Its source IP address 1216 is set to IP address 1225 and the destination IP address is set to IP address 1228. In this diagram, router/NAT rules 1224 will be applied before firewall rules 1227 and this can be done in different ways in the industry. If network message 1215 was sent to router 1202 from dcc manager 1205 with the source IP address 1216 set to IP address 1225, then corp execution environment would not know how to return the message because IP address 1225 is not a valid IP address for corporate network 1203. Network message 1215 is converted to network message 1211. The destination IP address 1217 does not need to change and it will be copied to destination IP address 1213. The source IP address 1216 needs to change and the router/NAT rules would change the source IP address 1216 from the value IP address 1225 to an external IP address 1223 as defined by launcher configuration FIG. 11 1127. The new network message 1211 will then be evaluated by the firewall rules 1227. In this case, it is ok to communicate with IP address 1228. The new network message 1211 can then be sent to router 1202 for final delivery to corp execution environment 1201.

Corporate execution environment 1201 needs to reply to the message and create a new network message 1207. The source IP address is set to IP address 1228 and the destination IP address is set to source IP address 1213 which was set to external IP address 1223. This message is then delivered to router 1202 which sends the message to dcc manager 1205. The message received is represented by network message 1211. The first operation is to apply the router/NAT rules. The source IP address 1212 is ok and is copied to new network message 1215 in the source IP address 1216. The destination IP address 1213 would be unknown in the data center container 1204 network because it is an external IP address 1223. The router/NAT rules 1224 will change it to IP address 1225 which is then copied into destination IP address 1217. The message is now ready to be delivered to dcc execution environment 1206.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

The invention claimed is:

1. A computerized method of creating a private network for one or more execution environments inside of an existing network using a data center container, such that the private network can provide one or more services that are independent of identical services of the existing network, the computerized method comprising:
    providing a first solution on an existing network, the solution using an existing service provided by the existing network;
    creating, in the existing network, a private network comprising:
        providing, by a data center container, a service in the private network that is identical to the existing service provided by the existing network; and
        managing, by a data center container manager, execution of one or more execution environments in the data center container using the identical service in the private network, such that the one or more execution environments can execute in the private network using the identical service without interfering with the operation of the existing service in the existing network; and
    providing a second solution on one or more of the one or more execution environments in the private network, the second solution being identical to the first solution, the one or more of the one or more execution environments using the identical service provided by the data center container, such that the second solution executes without interfering with the operation of the first solution in the existing network,
    wherein the identical service provides a network environment that is separate from the existing network, which allows a same IP address being used in the existing network to also be used for an execution environment of the one or more execution environments in the data center container.

2. The method of claim 1, wherein the network environment comprises a routing protocol configured to route:
    communications among internal devices operating in the private network; and
    communications between the internal devices in the private network and external devices in the existing network.

3. The method of claim 2, wherein each of the internal devices comprise a router table configured to route all communications to a router in the data center container manager.

4. The method of claim 2, wherein routing communications among internal devices comprises:
    receiving a communication from a first internal device in the private network destined for a second internal device in the private network; and
    transmitting the communication to the second internal device in the private network such that the first internal device and second internal device do not communicate directly with each other.

5. The method of claim 2, wherein routing communications between the internal devices in the private network and external devices in the existing network comprises:
    receiving a communication from a first internal device destined for a second external device;
    converting an internal IP address associated with the communication to an external IP address for the existing network; and
    transmitting the communication to the external network.

6. A system for creating a private network for one or more execution environments inside of an existing network using a data center container, such that the private network can provide one or more services that are independent of identical services of the existing network, the system comprising a processor in communication with a memory, wherein the processor is configured to run a computer program stored in the memory that is configured to:
    providing a first solution on an existing network, the solution using an existing service provided by the existing network;
    creating, in the existing network, a private network comprising:
        providing, by a data center container, a service in the private network that is identical to the existing service provided by the existing network; and
        managing, by a data center container manager, execution of one or more execution environments in the data center container using the identical service in the private network, such that the one or more execution environments can execute in the private network using the identical service without interfering with the operation of the existing service in the existing network; and
    providing a second solution on one or more of the one or more execution environments in the private network, the second solution being identical to the first solution, the one or more of the one or more execution environments using the identical service provided by the data center container, such that the second solution executes without interfering with the operation of the first solution in the existing network,
    wherein the identical service provides a network environment that is separate from the existing network, which allows a same IP address being used in the existing network to also be used for an execution environment of the one or more execution environments in the data center container.

7. The system of claim 6, wherein the network environment comprises a routing protocol configured to route:
    communications among internal devices operating in the private network; and communications between the internal devices in the private network and external devices in the existing network.

8. The system of claim 7, wherein each of the internal devices comprise a router table configured to route all communications to a router in the data center container manager.

9. The system of claim 7, wherein routing communications among internal devices comprises:
   receiving a communication from a first internal device in the private network destined for a second internal device in the private network; and
   transmitting the communication to the second internal device in the private network such that the first internal device and second internal device do not communicate directly with each other.

10. The system of claim 7, wherein routing communications between the internal devices in the private network and external devices in the existing network comprises:
    receiving a communication from a first internal device destined for a second external device;
    converting an internal IP address associated with the communication to an external IP address for the existing network; and
    transmitting the communication to the external network.

11. A non-transitory computer readable medium having executable instructions associated with a system for creating a private network for one or more execution environments inside of an existing network using a data center container, such that the private network can provide one or more services that are independent of identical services of the existing network, the executable instructions operable to cause the system to:
    provide a first solution on an existing network, the solution using an existing service provided by the existing network;
    create, in the existing network, a private network comprising:
       providing, by a data center container, a service in the private network that is identical to the existing service provided by the existing network; and
       managing, by a data center container manager, execution of one or more execution environments in the data center container using the identical service in the private network, such that the one or more execution environments can execute in the private network using the identical service without interfering with the operation of the existing service in the existing network; and
    provide a second solution on one or more of the one or more execution environments in the private network, the second solution being identical to the first solution, the one or more of the one or more execution environments using the identical service provided by the data center container, such that the second solution executes without interfering with the operation of the first solution in the existing network,
    wherein the identical service provides a network environment that is separate from the existing network, which allows a same IP address being used in the existing network to also be used for an execution environment of the one or more execution environments in the data center container.

12. The non-transitory computer readable medium of claim 11, wherein the network environment comprises a routing protocol configured to route:
    communications among internal devices operating in the private network; and
    communications between the internal devices in the private network and external devices in the existing network.

13. The non-transitory computer readable medium of claim 12, wherein each of the internal devices comprise a router table configured to route all communications to a router in the data center container manager.

14. The non-transitory computer readable medium of claim 12, wherein routing communications among internal devices comprises:
    receiving a communication from a first internal device in the private network destined for a second internal device in the private network; and
    transmitting the communication to the second internal device in the private network such that the first internal device and second internal device do not communicate directly with each other.

15. The non-transitory computer readable medium of claim 12, wherein routing communications between the internal devices in the private network and external devices in the existing network comprises:
    receiving a communication from a first internal device destined for a second external device;
    converting an internal IP address associated with the communication to an external IP address for the existing network; and
    transmitting the communication to the external network.

16. The computerized method of claim 1, wherein the identical service is at least one of a gateway service, DHCP service, DNS service, router service, or a NAT service.

17. The system of claim 6, wherein the identical service is at least one of a gateway service, DHCP service, DNS service, router service, or a NAT 106 service.

* * * * *